(12) United States Patent
Gandel et al.

(10) Patent No.: US 7,028,545 B2
(45) Date of Patent: Apr. 18, 2006

(54) POSITION SENSOR, DESIGNED IN PARTICULAR FOR DETECTING A STEERING COLUMN TORSION

(75) Inventors: Pierre Gandel, Montfaucon (FR); Didier Frachon, Besancon (FR); Didier Angleviel, Bescancon (FR); Claude Oudet, Bescancon (FR); Daniel Prudham, Thise (FR)

(73) Assignee: Moving Magnet Technologies (S.A.), Besancon (FR)

( * ) Notice: Subject to any disclaimer, the term of this patent is extended or adjusted under 35 U.S.C. 154(b) by 0 days.

(21) Appl. No.: 10/258,585

(22) PCT Filed: Feb. 27, 2002

(86) PCT No.: PCT/FR02/00718

§ 371 (c)(1),
(2), (4) Date: Feb. 13, 2003

(87) PCT Pub. No.: WO02/071019

PCT Pub. Date: Sep. 12, 2002

(65) Prior Publication Data

US 2004/0011138 A1 Jan. 22, 2004

(30) Foreign Application Priority Data

Mar. 2, 2001 (FR) ................... 01 02905

(51) Int. Cl.
*G01F 23/02* (2006.01)
(52) U.S. Cl. ..................................... 73/328
(58) Field of Classification Search .................. 73/168, 73/862.333, 862.322, 862.335, 862.331, 73/862.326, 847, 1.75; 324/207.2, 207.1; 310/49 R; 50/317
See application file for complete search history.

(56) References Cited

U.S. PATENT DOCUMENTS

| 4,672,247 A | * | 6/1987 | Madsen et al. ............ 310/49 R |
| 4,784,002 A | | 11/1988 | Io |
| 4,939,456 A | * | 7/1990 | Morelli et al. ......... 324/207.21 |

(Continued)

FOREIGN PATENT DOCUMENTS

DE 198 16 831 10/1999

(Continued)

*Primary Examiner*—Max Noori
*Assistant Examiner*—Octavia Davis
(74) *Attorney, Agent, or Firm*—Oblon, Spivak, McClelland, Maier & Neustadt, P.C.

(57) ABSTRACT

The invention concerns a position sensor, designed in particular for detecting a steering column torsion, consisting of a first magnetic structure including a plurality of magnets and a second magnetic structure including two ferromagnetic rings (6, 7) having a plurality of teeth (11, 12) and defining an air gap wherein is placed at least a magneto-sensitive element (15), the two magnetic structures being respectively integral with two parts in relative rotation. The invention is characterised in that the two ferromagnetic rings (6, 7) are nested and have each a substantially tubular part forming axially oriented teeth (11, 123) connected by a flux-closing zone (13, 14), the detecting air gap being delimited by said flux-closing zones.

16 Claims, 9 Drawing Sheets

U.S. PATENT DOCUMENTS

| | | | |
|---|---|---|---|
| 4,984,474 A | | 1/1991 | Matsushima et al. |
| 5,434,504 A | * | 7/1995 | Hollis et al. ............ 324/207.17 |
| 5,532,585 A | * | 7/1996 | Oudet et al. ............ 324/207.22 |
| 5,627,465 A | * | 5/1997 | Alfors et al. ............. 324/207.2 |
| 5,705,756 A | * | 1/1998 | LeMarquand et al. . 73/862.332 |
| 5,818,038 A | * | 10/1998 | Kerkmann et al. ..... 250/231.13 |
| 5,919,241 A | * | 7/1999 | Bolourchi et al. ............. 701/41 |
| 6,161,644 A | * | 12/2000 | Kim ........................... 180/443 |
| 6,240,678 B1 | * | 6/2001 | Spether ........................ 53/317 |
| 6,476,600 B1 | * | 11/2002 | Kono et al. ............... 324/207.2 |
| 6,546,780 B1 | * | 4/2003 | Palfenier et al. .............. 73/1.75 |
| 6,598,490 B1 | * | 7/2003 | Strothmann ............. 73/862.331 |

FOREIGN PATENT DOCUMENTS

| | | |
|---|---|---|
| DE | 198 17 886 | 10/1999 |
| GB | 588 677 | 5/1947 |

* cited by examiner

POSITION SENSOR, DESIGNED IN PARTICULAR FOR DETECTING A STEERING COLUMN TORSION

This application is a 371 of PCT/FR02/00718.

BACKGROUND OF THE INVENTION

1. Field of the Invention

The present invention relates to the art of position sensors, and more particularly to position sensors intended to measure the torsion of a steering column, although such an application is not exclusive.

2. Description of the Related Art

In the prior art there is known U.S. Pat. No. 4,984,474, which describes a prior art sensor provided with a stator part comprising a ferromagnetic piece forming radial teeth at two levels, disposed facing multi-pole magnets that are radially magnetized in alternating directions.

An additional ferromagnetic piece is disposed facing the stator part, and forms an air gap in which there is placed a Hall probe.

This prior art solution is not satisfactory, because it leads to a loss of magnetic signal between the stator part and the part containing the Hall probe. Furthermore, the magnetic field generated by the magnets leads to losses due to the sensor structure.

Also known in the prior art is a sensor described in U.S. Pat. No. 4,784,002, which describes another position sensor comprising a part provided with a plurality of axially oriented magnets cooperating with radial teeth of a stator part.

This structure also leads to magnetic leaks and to reduced efficiency, manifested by a poor "signal-to-noise" ratio.

BRIEF SUMMARY OF THE INVENTION

The object of the present invention is to overcome these disadvantages by providing an improved position sensor with better signal-to-noise ratio.

Another object of the invention is to reduce the radial space requirement.

To this end, the invention relates in its most general concept to a position sensor, intended in particular for detection of the torsion of a steering column, comprising a first magnetic structure containing a plurality of radially magnetized magnets and a second magnetic structure containing two ferromagnetic rings provided with a plurality of teeth and defining an air gap, in which there is placed at least one magnetosensitive element, the two magnetic structures being integral respectively with two parts in relative rotation, characterized in that the two ferromagnetic rings are intermeshed and each is provided with a substantially tubular part forming axially oriented teeth, connected by a transverse flux-closure zone, the detecting air gap being bounded by the said flux-closure zones.

The first magnetic structure is advantageously composed of a ferromagnetic tubular yoke provided with a plurality of tangential notches, in which there are seated thin magnets magnetized substantially radially in identical directions.

According to a preferred embodiment, the height of the teeth corresponds substantially to the height of the magnets.

According to an alternative embodiment, the first and second magnetic structures are movable relative to the magnetosensitive element.

According to a special embodiment, the position sensor is provided with N magnetosensitive elements, N corresponding to the number of phases of a brushless DC motor whose movement is controlled by the said sensor.

According to a first embodiment, the rings are provided with flux-closure zones having the shape of disks.

According to a second embodiment, the rings are provided with flux-closure zones having the shape of half-toruses.

According to a third embodiment, the rings are provided with flux-closure zones cut to form a plurality of teeth.

According to another embodiment, the rings are provided with flux-closure zones extending over 360° C.

According to another alternative embodiment, the rings are provided with flux-closure zones extending over an annular sector corresponding substantially to the dimension of the magnetosensitive element.

The invention also relates to a torsion sensor comprising two rotating parts connected by an elastic test member, and a position sensor comprising two parts integral respectively with the said rotating parts, the position sensor being composed of a first magnetic structure containing a plurality of radially magnetized magnets and a second magnetic structure containing two ferromagnetic rings provided with a plurality of teeth and defining an air gap, in which there is placed at least one magnetosensitive element, the two magnetic structures being integral respectively with two parts in relative rotation, characterized in that the two ferromagnetic rings are intermeshed and each is provided with a substantially tubular part forming axially oriented teeth, connected by a transverse flux-closure zone, the detecting air gap being bounded by the said flux-closure zones.

BRIEF DESCRIPTION OF THE SEVERAL VIEWS OF THE DRAWINGS

The present invention will be better understood by reading the description hereinafter with reference to the attached drawings pertaining to a non-limitative embodiment, wherein.

DETAILED DESCRIPTION OF THE INVENTION

Figure 1:
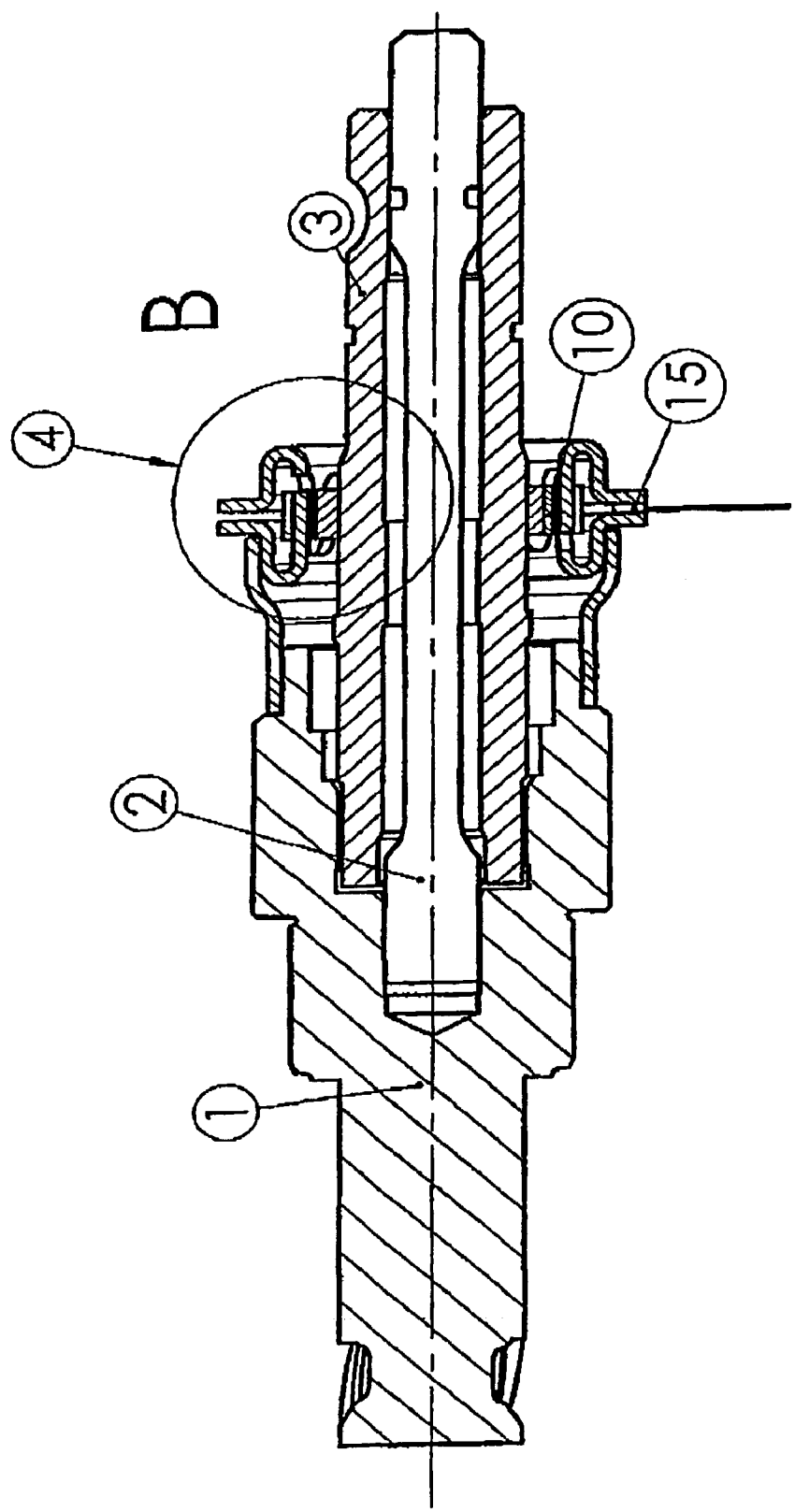
FIG. 1 illustrates a schematic view of a steering column.

The object of the invention is to overcome these problems of low sensitivities and it relates to contactless position sensors intended for the measurement of angles similar to or smaller than 10° C., in applications such as steering-column torque sensors, for example (the signal then will be processed to provide steering assistance). The angular position sensor described hereinafter is intended for the measurement of a very small angular difference (a few degrees) between two shafts connected by a torsion bar. Such an application for torque measurement is described in FIG. 1. In the range of linear deformation of this torsion bar, this angular difference (α1−α2) will be proportional to the torque applied between the two shafts (1, 3) connected by an elastically deformable test member (2). The measurement of this angular difference by the sensor will allow an electrical signal proportional to the applied torque to be delivered at the output of the magnetosensitive element. In the case of the steering-column torque sensor, the sensor (4) must also permit measurement of the angular difference between two shafts turning relative to the fixed frame of reference represented by the passenger compartment of the vehicle. This means that $\alpha_1$ and $\alpha_2$ are angles that can be larger than 360° (the steering column can execute several turns). The angular measurement must therefore take place between the two shafts (1, 3) when the torsion bar (2) is deformed, each of the two shafts being freely rotatable through several turns. A typical torsional working angle in this application is from ±2° to at most ±4°. It is therefore evident that the problem consists of providing on the one hand a highly sensitive position sensor and on the other hand a system with which the magnetosensitive element can be fixed relative to the passenger compartment as the frame of reference.

Figure 2:
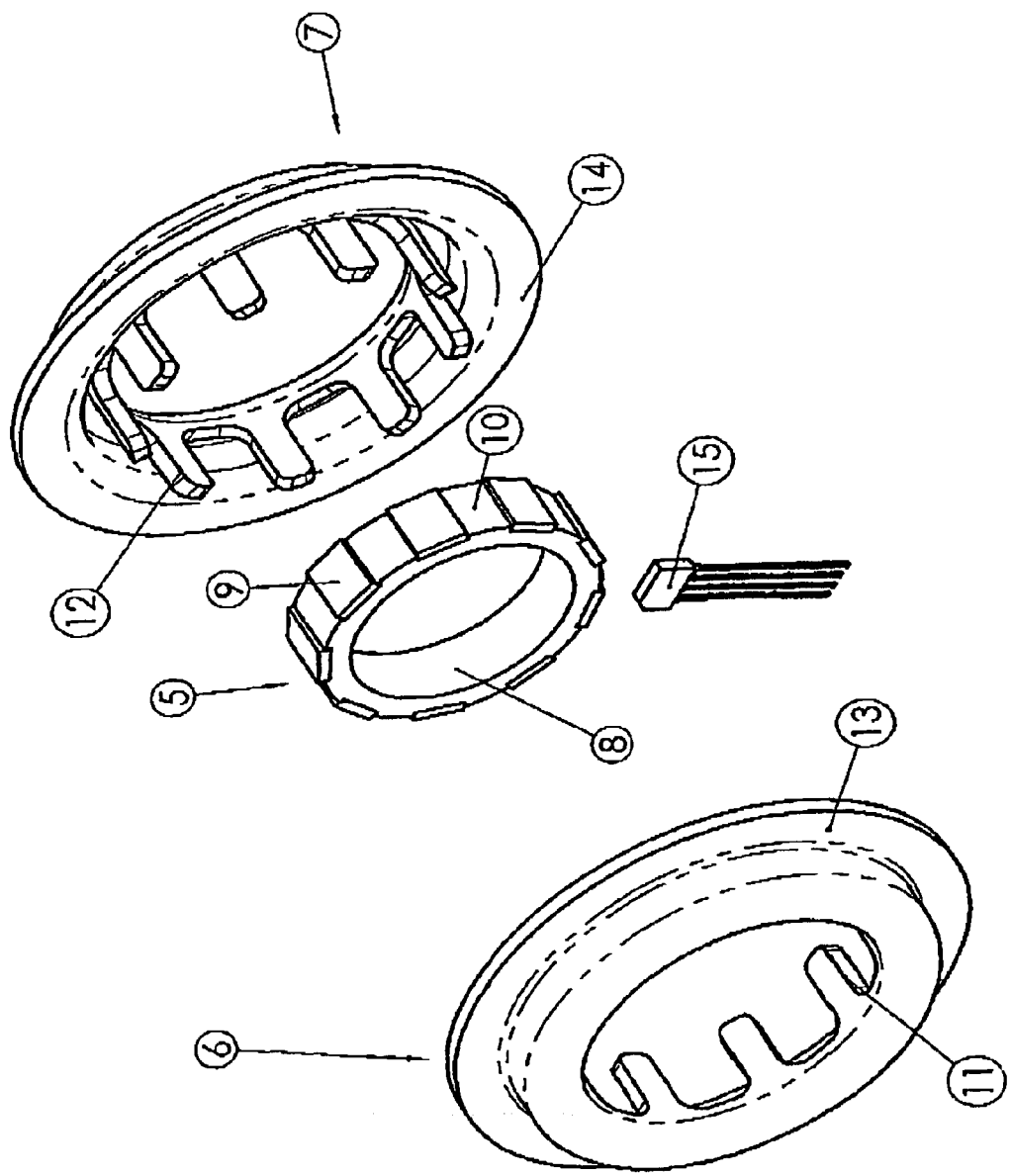
FIG. 2 illustrates an exploded view of a first practical example of a sensor.

FIG. 2 illustrates an exploded view of a first practical example of a sensor according to the invention.

It is composed of a first magnetic structure (5) and of a second magnetic structure formed by two intermeshing rings (6, 7). The two magnetic structures have tubular general shape and are coaxial.

The first magnetic structure (5) is formed by a yoke (8) of tubular shape provided with cavities for seating a plurality of thin magnets (9) magnetized in radial direction, or in a direction parallel to the radial direction and passing through the center of the magnet.

These magnets are embedded in a cavity having a thickness of between 0.2 and 0.9 times that of the magnet.

The magnets are separated by angular sectors (10) of the yoke.

The second structure is formed by two ferromagnetic rings (6, 7) provided with teeth (11, 12) that extend axially and that are separated by open intervals allowing intermeshing with the teeth of the opposite ring.

The teeth are prolonged by respective flux-closure zones (13, 14) extending generally in a transverse plane, perpendicular to the main orientation of the teeth.

These two flux-closure zones bound an annular air gap (16) in which there is positioned a magnetosensitive element (15).

Figure 3:
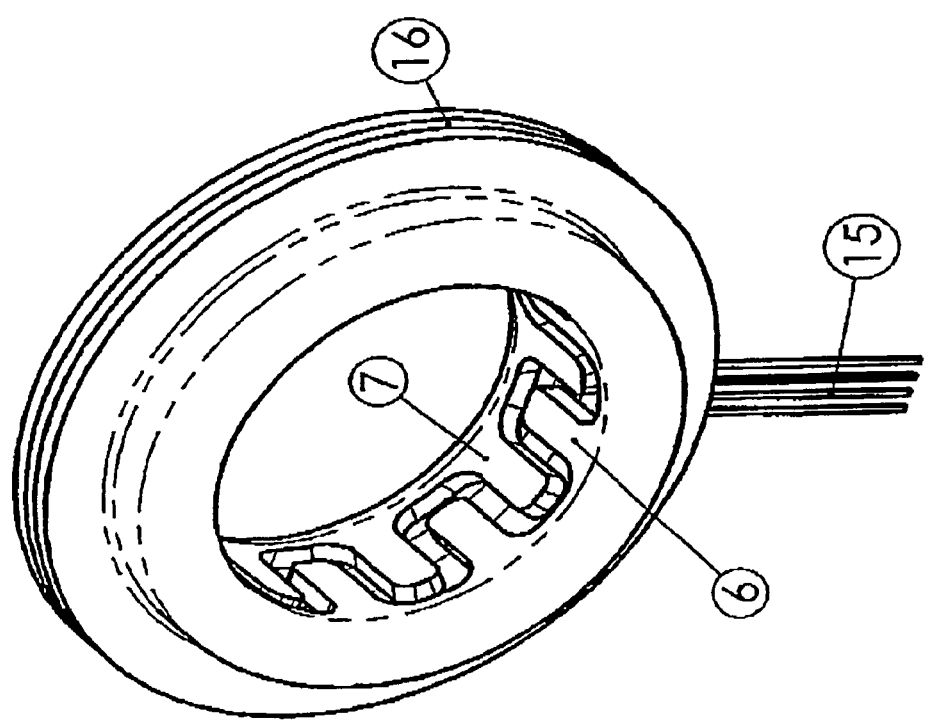
FIG. 3 illustrates a view of the second structure of the said sensor.
Figure 4:
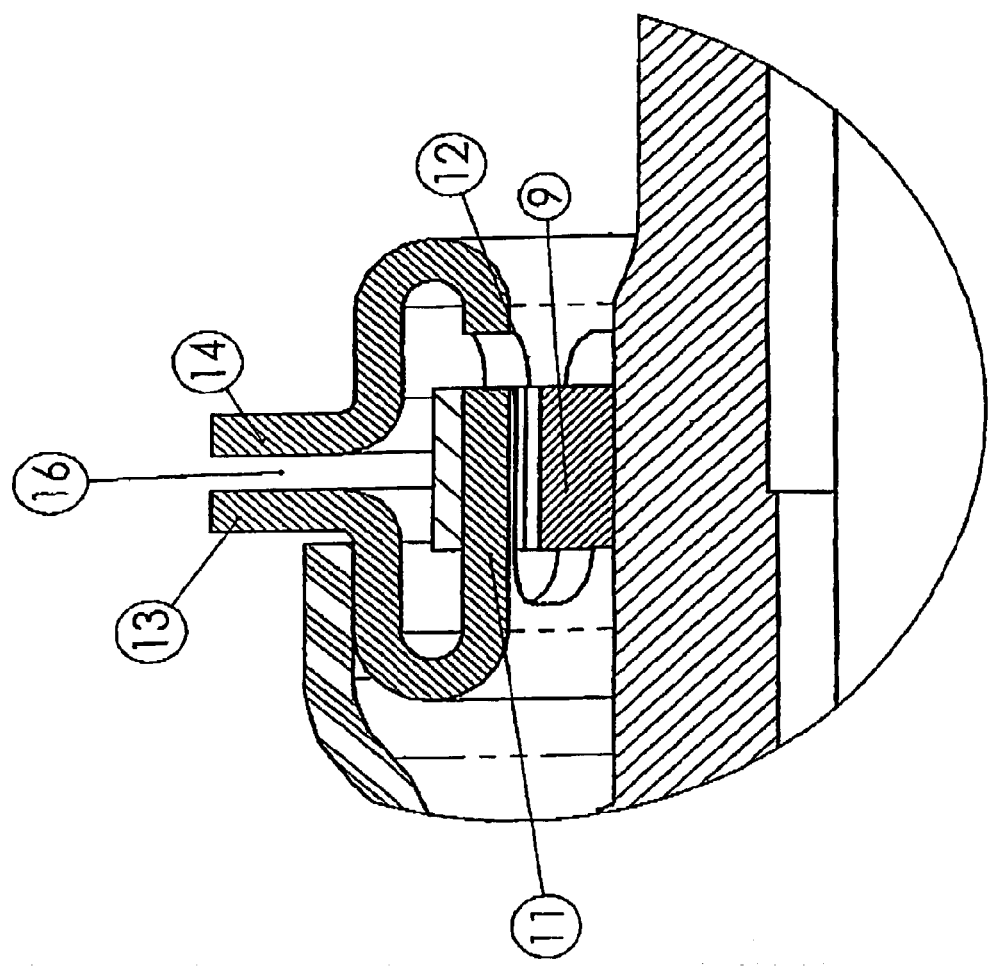
FIG. 4 illustrates an enlarged view, in partial section, of the sensor.

FIG. 3 illustrates a view of the second structure in assembled condition, without the first structure, which is now lodged in the central cavity, and FIG. 4 shows a view in detail and in section of the said sensor.

The first structure is provided with N magnets (9), and each of the rings of the second structure has N teeth. The magnetosensitive element (15), a programmable Hall-effect probe, for example, is fixed relative to the fixed frame of reference corresponding to the passenger compartment. It is placed in the air gap (16) between the two ferromagnetic collectors (13, 14), each of which has collected the flux of N teeth, and in such a way as to allow the two collars to turn through several turns.

Each of the structures can rotate relative to the frame of reference of the passenger compartment, and exhibits a differential movement of a few degrees relative to the other as a function of the applied torque, which will be manifested by a flux variation of a few hundred Gauss in the rotating air-gap (16). The analog signal emitted by the Hall probe (15) will therefore deliver an electrical image of the torque applied between the two shafts supporting the stator (6, 7) on the one hand and the rotor (5) on the other.

In the case of steering-column torque sensors, the torque information is generally processed so as to drive an electric motor of the brushless DC type (BLDC). The action of this electric motor will be to provide electrical steering assistance, by delivering a torque proportional to that detected by the torque sensor, while following a position proportional to that of the steering column. Such motors generally have three windings known as "phases", offset by an electrical angle of 120°. Rotation of these three-phase motors is assured by a controller, which will generate three sinusoidal signals of amplitude proportional to the torque delivered by the torque sensor, while following a position proportional to that of the steering column, In general, these two torque and position signals are obtained from two different sensors.

Figure 5:
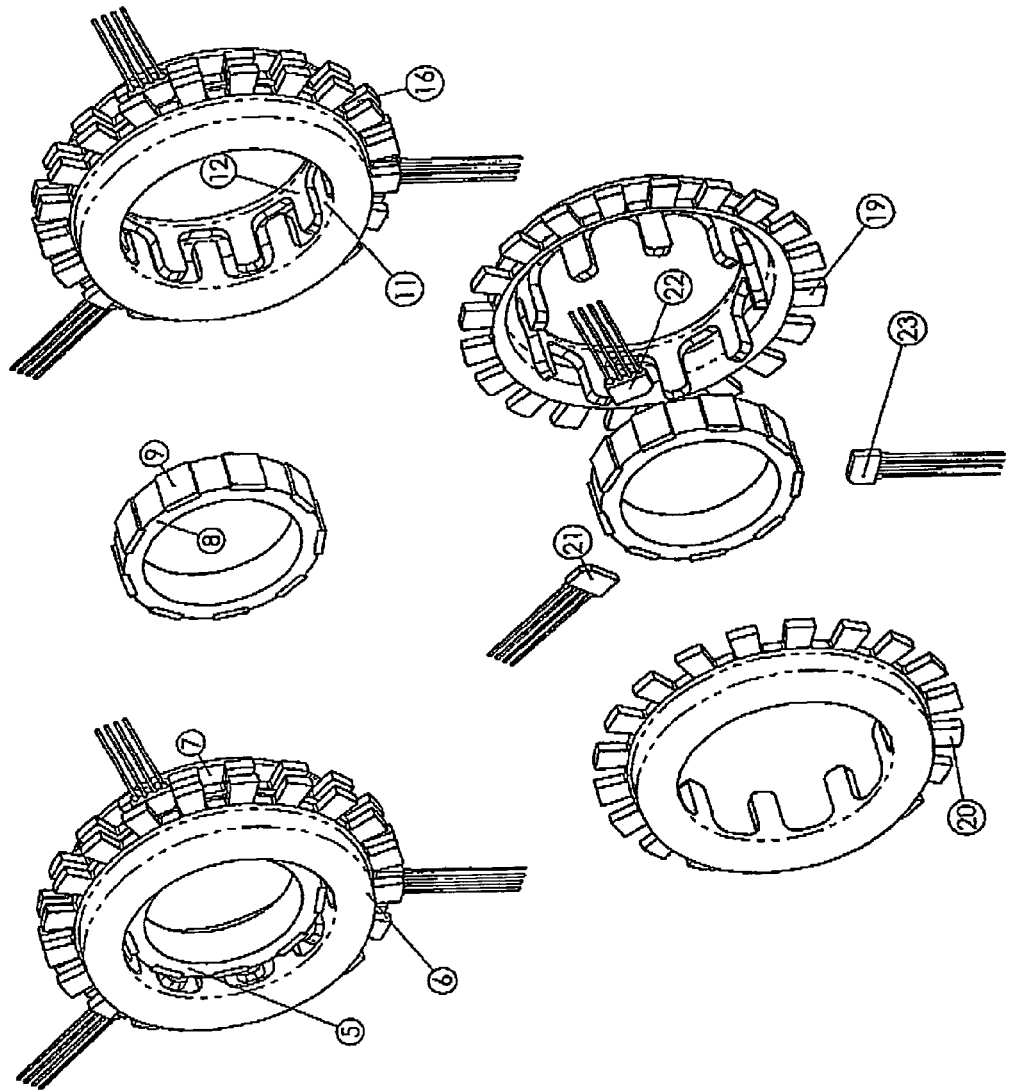
FIG. 5 illustrates an exploded view of a second embodiment.

According to the invention described in FIG. 5, the magnetic collectors (13, 14) can be toothed and can have D teeth (19, 20) over 360°. A magnetosensitive element (15) placed in the air gap (16) of FIG. 5 will therefore sense an alternating magnetic field, whose period is proportional to D and to the position of the "stator" part (5) which is rotating relative to the fixed frame of reference of the passenger compartment (but is a stator relative to the rotor (6, 7)), and is also proportional to the torque exerted between (5) and (6, 7).

Figure 6:
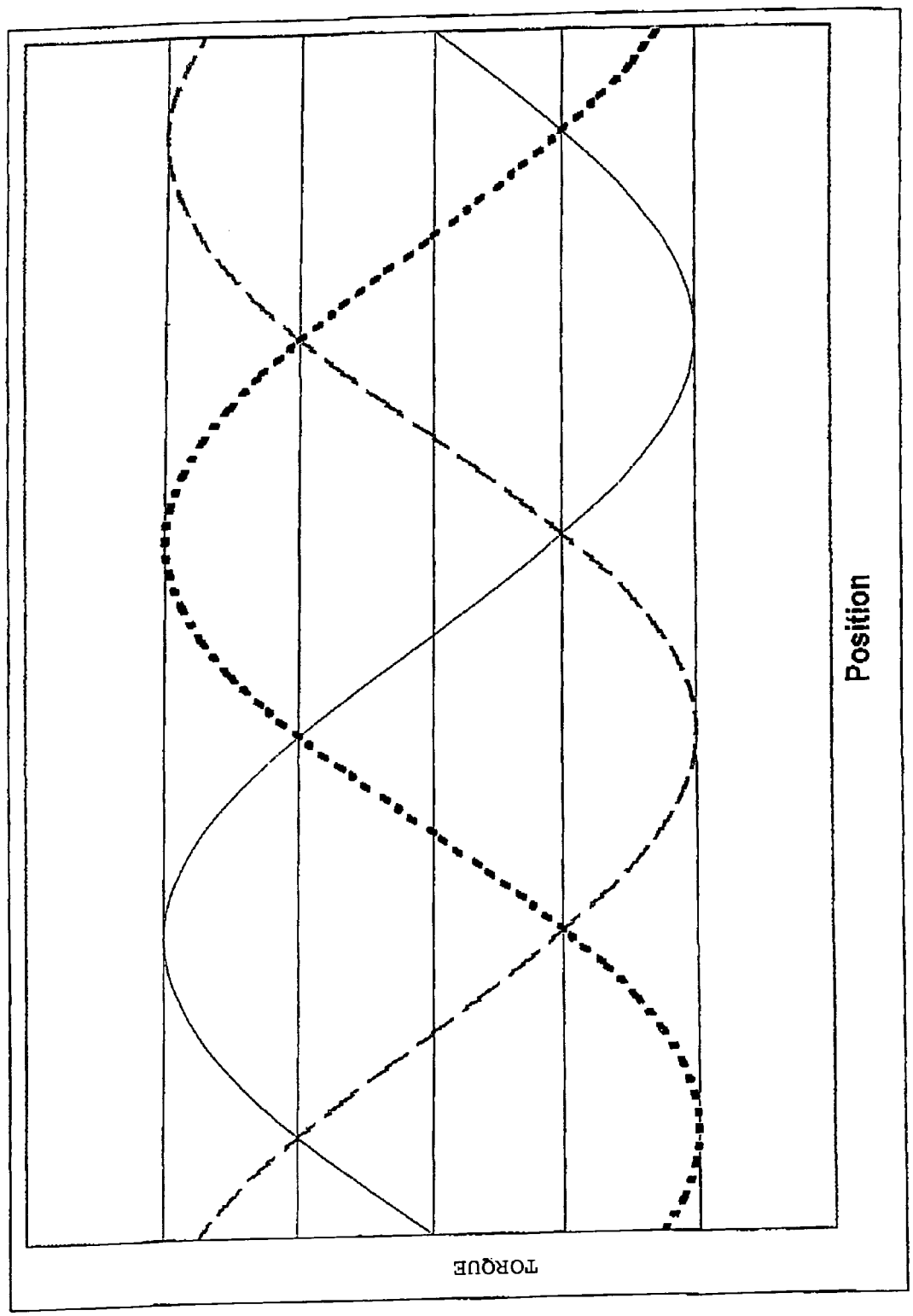
FIG. 6 illustrates the response curve of the sensor according to FIG. 5.

If three magnetosensitive elements (21, 22, 23) spaced apart by a pole offset equivalent to an electrical period of 120° are placed in the air gap (16), there is obtained at the output of these three magnetosensitive elements the three sinusoidal curves described in FIG. 6, the amplitude of which is proportional to the torque exerted on the steering column, and which at the same time yield information on the position of the steering column.

If the number D of teeth is chosen judiciously as a function of the reduction ratio R that is often associated with the BLDC motor, these two combined signals can be used directly to drive the BLDC motor via a transistorized power module.

Figure 7:
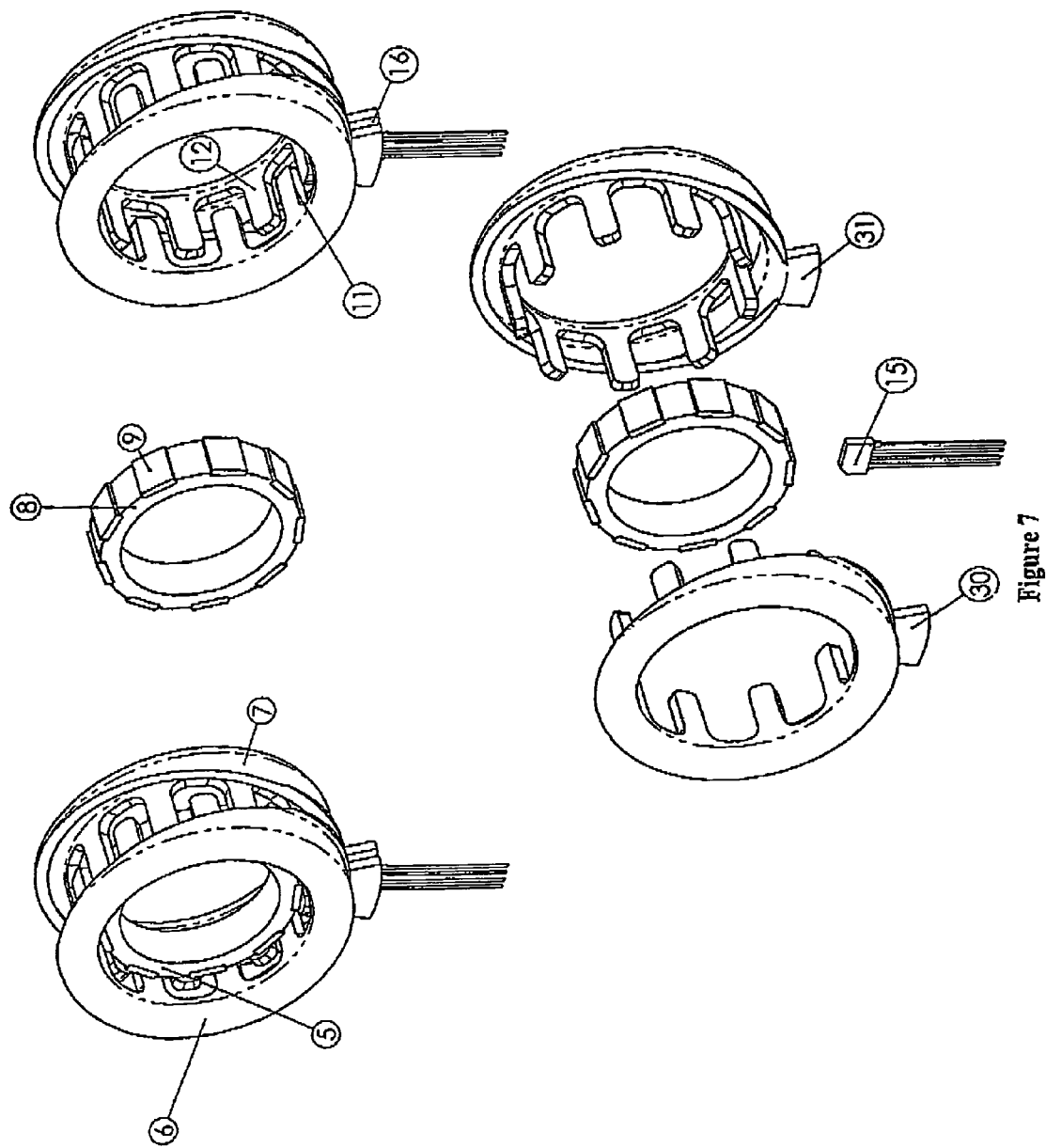
FIG. 7 illustrates another alternative embodiment (fixed probe and fixed stator)

FIG. 7 illustrates another alternative embodiment, in which the rings are provided with two flux-closure zones reduced to reduced angular sectors (30, 31), whose dimensions correspond substantially to the dimensions of the Hall probe (15).

The principle described hereinabove is not limited to applications as a steering-column torque sensor but can also be applied to measurements of very small angles, such as applications as a brake-pedal or accelerator-pedal sensor. In fact, it is possible to imagine the two ferromagnetic collectors (13, 14) as not extending over 360° but as being limited to a few dozen degrees, as indicated in FIG. 7.

Figure 8:
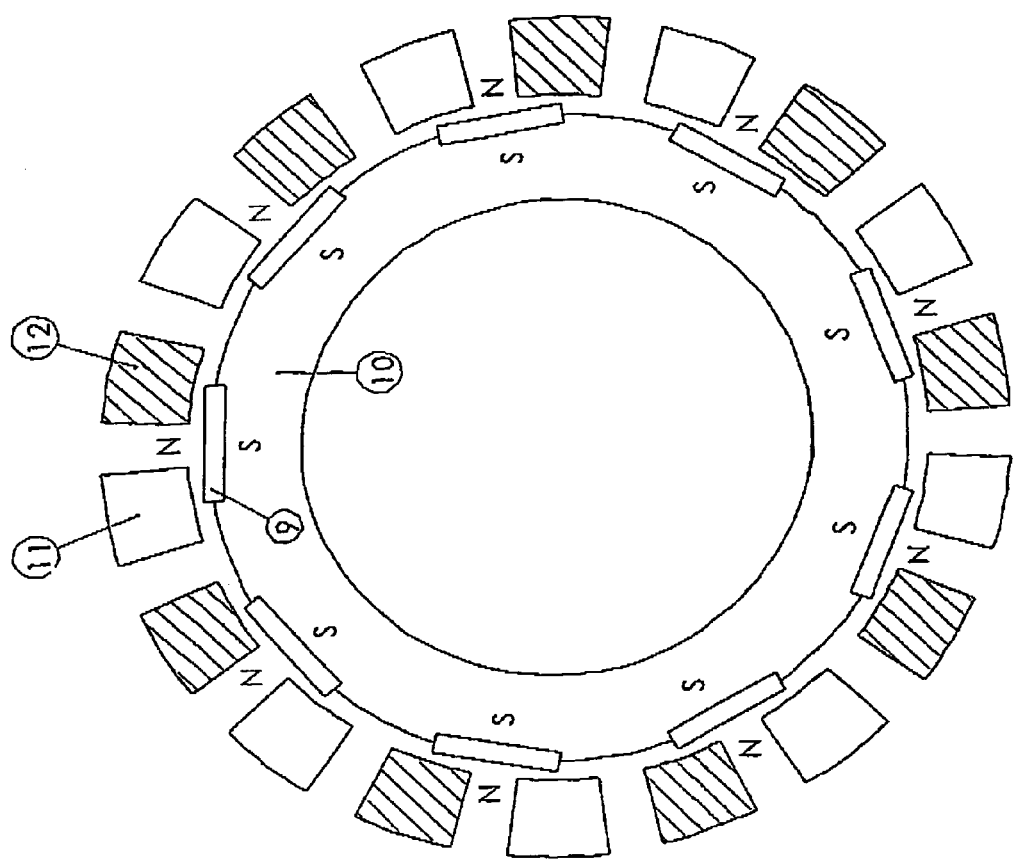
FIG. 8 illustrates a cross-sectional view.

FIG. 8 illustrates a cross-sectional view of the sensor.

Figure 9:
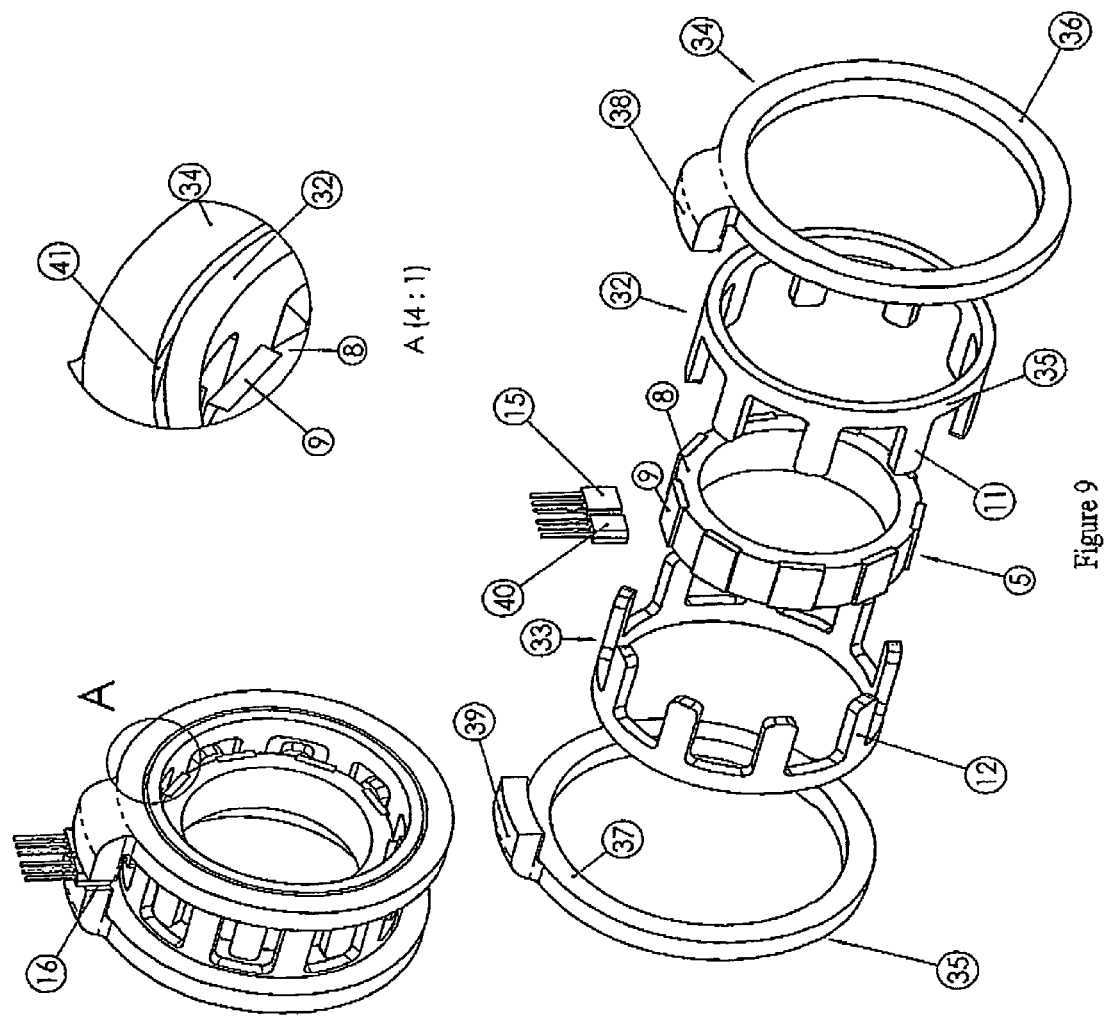
FIG. 9 illustrates an alternative embodiment of the invention in which the detecting air gap is disposed between two fixed elements.

The alternative structure illustrated in FIG. 9 was developed with the objective of creating the detecting air gap (16) between two fixed elements (34, 35).

In the same way as in the structures illustrated in the preceding figures, a variation of induction is created in the teeth (11, 12) by an angular phase shift between the first magnetic structure, or in other words the rotor (5), and two intermeshed magnetic structures, which in this case are toothed pieces (32, 33). The magnetic circuit is then prolonged by fixed elements (34, 35) separated from the magnetic structures (32, 33) by a mechanical gap (41). Thus, in this alternative, the rings (6, 7) are therefore composed of two movable toothed pieces (32, 33) and two fixed elements (34, 35).

The two fixed elements (34, 35) are composed of two flux-integration zones (36, 37) that completely (angle of 360°) or partly surround the toothed pieces (32, 33), and of two magnetic-flux concentrators (38, 39), which create a detecting air gap (16) in which there are inserted the magnetosensitive element or elements (15, 40).

The invention claimed is:

1. A position sensor, comprising:
   a first magnetic structure containing a plurality of magnets;
   a second magnetic structure containing two ferromagnetic rings provided with a plurality of teeth and defining an air gap;
   at least one magnetosensitive element placed in the air gap;
   the first and second magnetic structures being integral respectively with two parts in relative rotation,
   wherein the two ferromagnetic rings are intermeshed and each is provided with a substantially tubular part forming axially oriented teeth, connected by a flux-closure zone, the air gap being bounded by the flux-closure zones, and
   wherein each magnet of the plurality of magnets has an edge that faces at least one tooth of the teeth of the two ferromagnetic rings.

2. A position sensor according to claim 1, wherein the position sensor is configured for detecting torsion of a steering column.

3. A position sensor according to claim 1, wherein the first magnetic structure is composed of a ferromagnetic tubular yoke provided with a plurality of tangential notches in which are seated thin magnets magnetized substantially radially in identical directions.

4. A position sensor according to claim 3, wherein the thin magnets are in a form of radially magnetized tiles.

5. A position sensor according to claim 3, wherein the thin magnets are in a form of parallelepiped magnets magnetized in a direction perpendicular to a plane of a main face.

6. A position sensor according to claim 1, wherein a height of the teeth corresponds substantially to a height of the plurality of magnets.

7. A position sensor according to claim 1, wherein at least one of the first and second magnetic structures is movable relative to the at least one magnetosensitive element.

8. A position sensor according to claim 1, wherein the at least one magnetorestrictive element comprises N magnetosensitive elements, N corresponding to a number of phases of a brushless DC motor whose movement is controlled by the position sensor.

9. A position sensor according to claim 1, wherein the two ferromagnetic rings are provided with flux-closure zones having a shape of transverse disks.

10. A position sensor according to claim 1, wherein the two ferromagnetic rings are provided with flux-closure zones having a shape of half-toruses.

11. A position sensor according to claim 1, wherein the two ferromagnetic rings are provided with flux-closure zones of tubular shape.

12. A position sensor according to claim 1, wherein the two ferromagnetic rings are provided with flux-closure zones cut to form a plurality of teeth.

13. A position sensor according to claim 1, wherein the two ferromagnetic rings are provided with flux-closure zones extending over 360° C.

14. A position sensor according to claim 1, wherein the two ferromagnetic rings are provided with flux-closure zones extending over an annular sector corresponding substantially to a dimension of the magnetosensitive element.

15. A position sensor according to claim 1, wherein the two ferromagnetic rings are composed of two movable toothed pieces and two fixed elements.

16. A torsion sensor comprising:
   two rotating parts connected by an elastic test member;
   a position sensor comprising two parts integral respectively with the two rotating parts,
   the position sensor being composed of a first magnetic structure containing a plurality of radially magnetized magnets and a second magnetic structure containing two ferromagnetic rings provided with a plurality of teeth and defining an air gap, at least one magnetosensitive element placed in the air gap, the first and second magnetic structures being integral respectively with two parts in relative rotation, wherein the two ferromagnetic rings are intermeshed and each is provided with a substantially tubular part forming axially oriented teeth, connected by a transverse flux-closure zone, the air gap being bounded by the flux-closure zones, wherein each magnet of the plurality of magnets has an edge that faces at least one tooth of the teeth of the two ferromagnetic rings.

* * * * *

UNITED STATES PATENT AND TRADEMARK OFFICE
CERTIFICATE OF CORRECTION

| | |
|---|---|
| PATENT NO. | : 7,028,545 B2 |
| APPLICATION NO. | : 10/258585 |
| DATED | : April 18, 2006 |
| INVENTOR(S) | : Gandel et al. |

Page 1 of 1

It is certified that error appears in the above-identified patent and that said Letters Patent is hereby corrected as shown below:

On the title page, Item (75), the 3$^{rd}$ and 4$^{th}$ inventor's city of residence are incorrect. Item (75) should read:

-- (75) Inventors: Pierre Gandel, Montfaucon (FR); Didier Frachon, Besancon (FR); Didier Angleviel, Besancon (FR); Claude Oudet, Besancon (FR); Daniel Prudham, Thise (FR) --

Signed and Sealed this

First Day of August, 2006

JON W. DUDAS
*Director of the United States Patent and Trademark Office*